United States Patent

De Filippo

[11] Patent Number: 5,820,222
[45] Date of Patent: Oct. 13, 1998

[54] UPHOLSTERY SECURING DEVICE FOR A MOTOR-VEHICLE HEADREST AND THE LIKE

[75] Inventor: Emilio De Filippo, Bruzolo, Italy

[73] Assignee: Gestind-M.B. "Manifattura di Brusolo" S.p.A., Turin, Italy

[21] Appl. No.: 924,738

[22] Filed: Sep. 5, 1997

[30] Foreign Application Priority Data

Feb. 18, 1997 [IT] Italy ................................ TO97A00132

[51] Int. Cl.⁶ .................................................. A47C 31/02
[52] U.S. Cl. ................ 297/452.58; 297/220; 297/218.5; 297/218.3; 297/228.13
[58] Field of Search .............................. 297/452.58, 220, 297/218.3, 228.13, 218.4, 218.5, 227; 5/402, 403, 404, 405, 406; 24/562, DIG. 22

[56] References Cited

U.S. PATENT DOCUMENTS

| | | | |
|---|---|---|---|
| 1,301,021 | 4/1919 | Walker | 5/402 |
| 3,925,861 | 12/1975 | Tillner | 5/403 |
| 3,962,757 | 6/1976 | Gedney | 24/562 |
| 5,121,963 | 6/1992 | Kwasnik et al. | 297/227 |
| 5,261,726 | 11/1993 | Yanagishita | 297/391 |
| 5,499,859 | 3/1996 | Angell | 297/218.3 |

FOREIGN PATENT DOCUMENTS 3116980  12/1982  Germany ................................ 297/220

*Primary Examiner*—Peter R. Brown
*Assistant Examiner*—Anthony D. Barfield
*Attorney, Agent, or Firm*—Sughrue, Mion, Zinn, Macpeak & Seas, PLLC

[57] ABSTRACT

Upholstery securing device for motor-vehicle articles comprising a body of yelding material and a flexible upholstery sheet laid upon the body. The device comprises a retainer member fixed to the body and having at least one indented slot for receiving and irreversibly anchoring at least one edge of the flexible upholstery sheet.

6 Claims, 3 Drawing Sheets

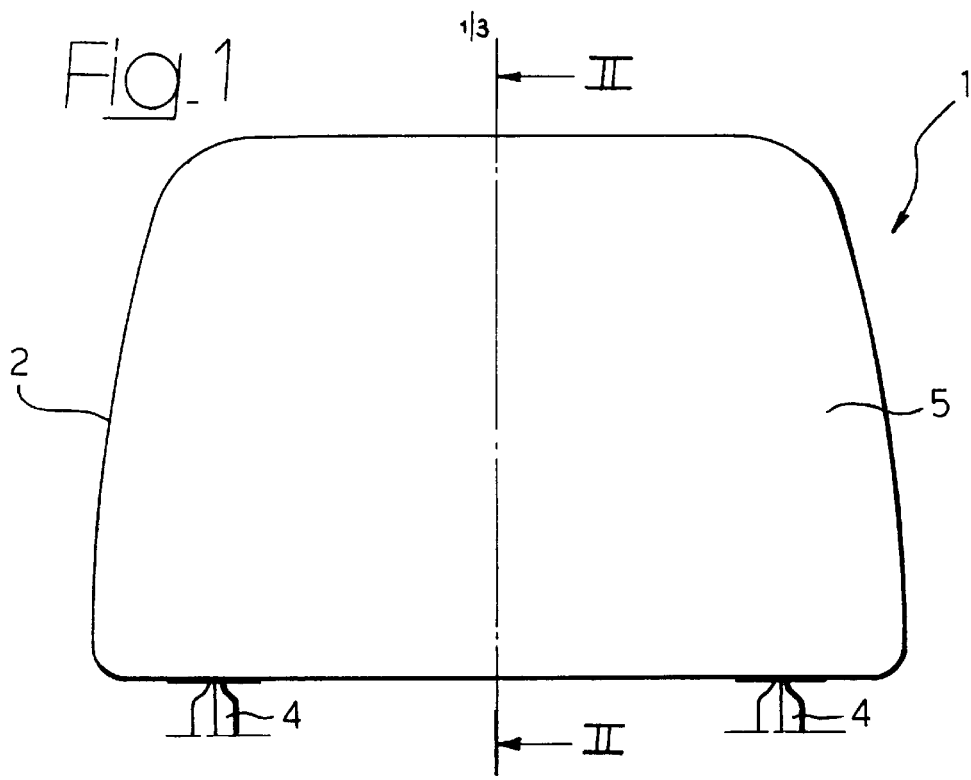
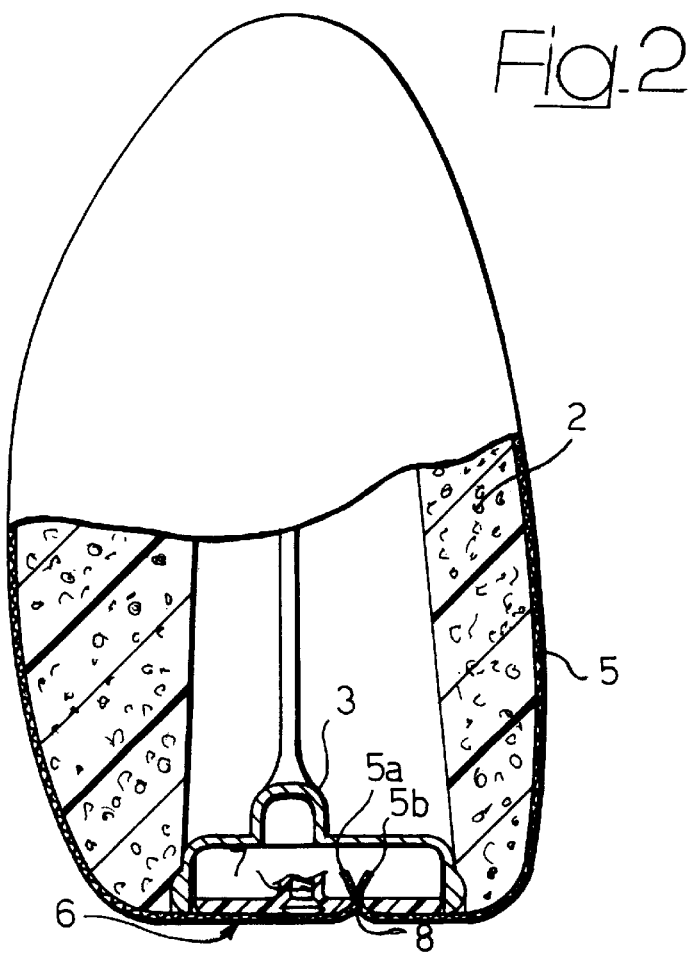
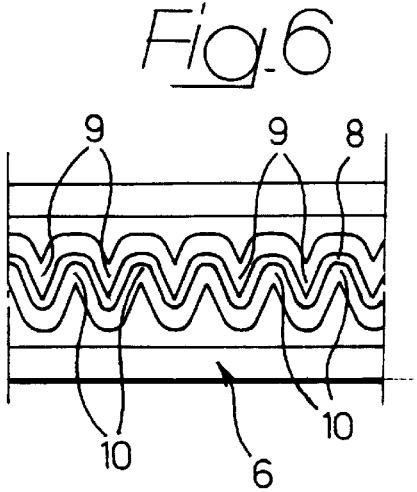

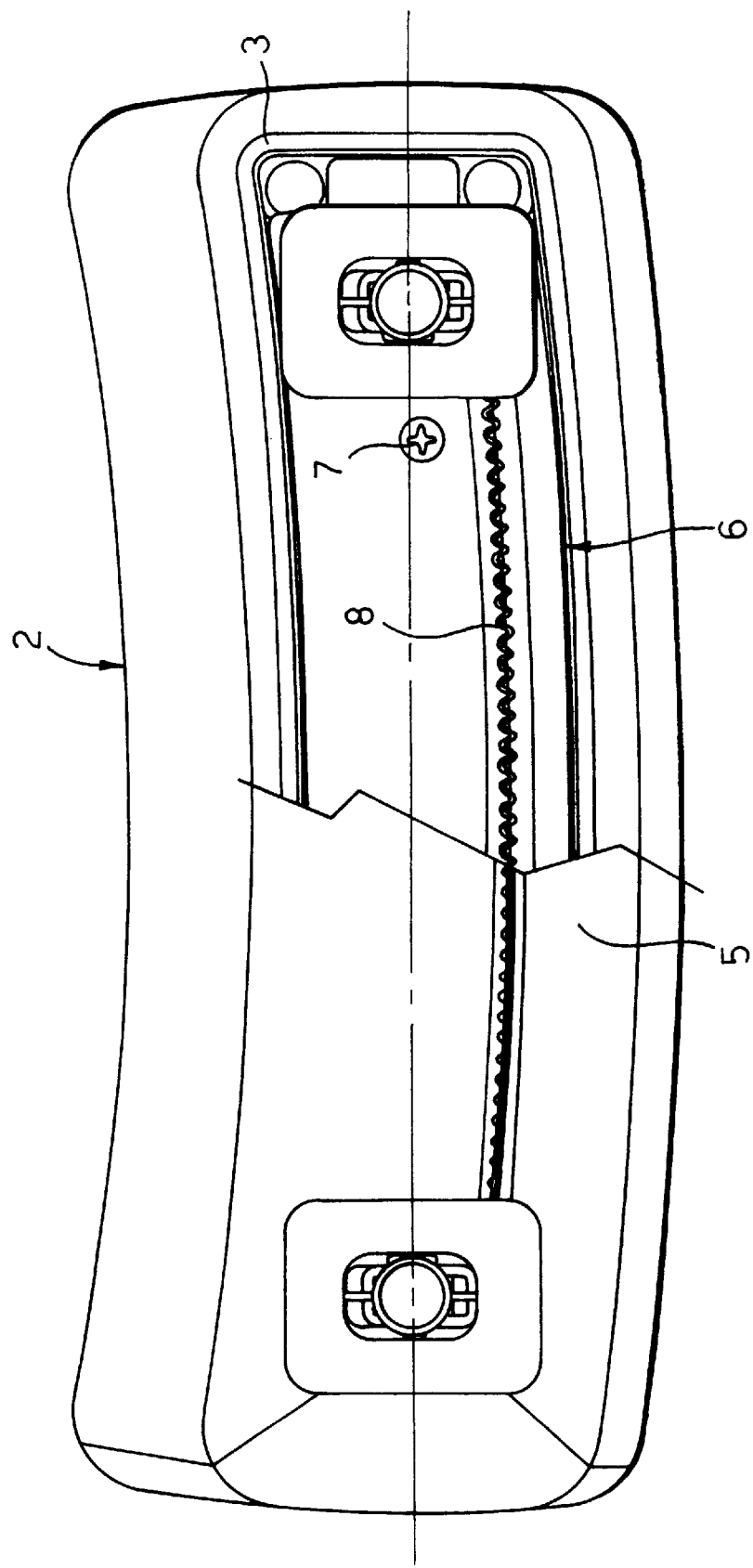

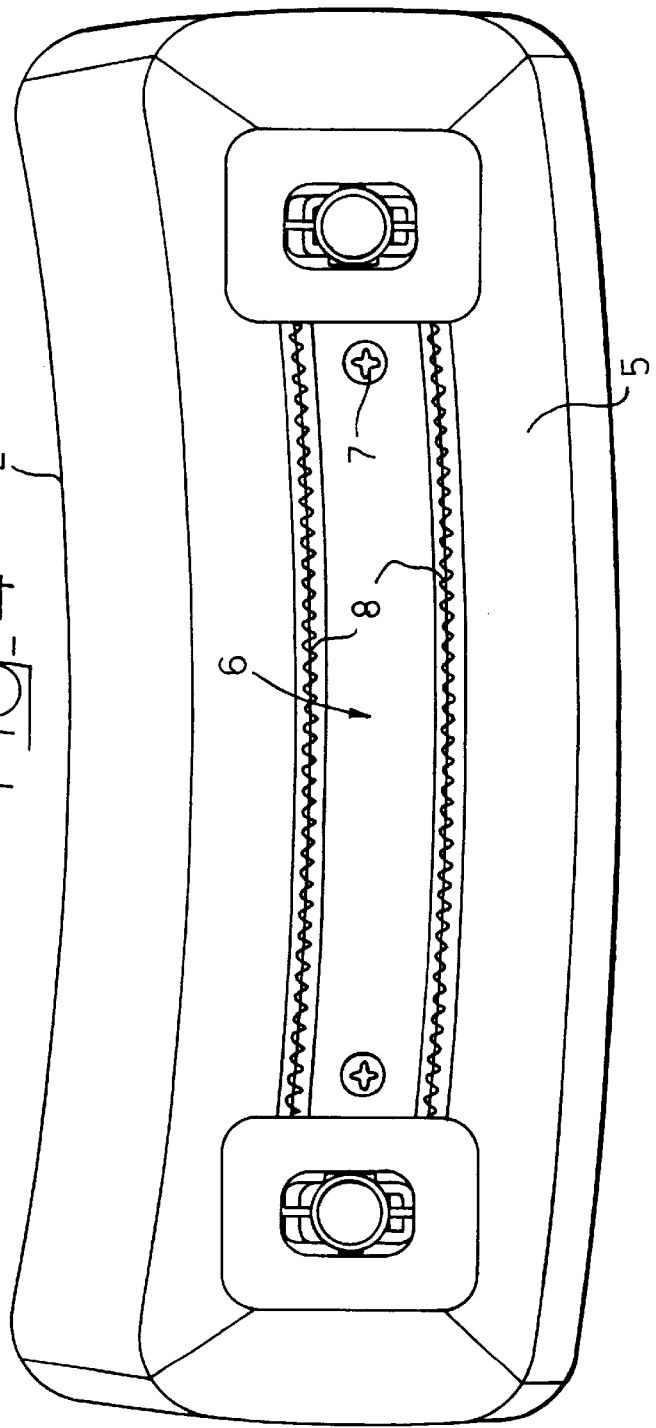
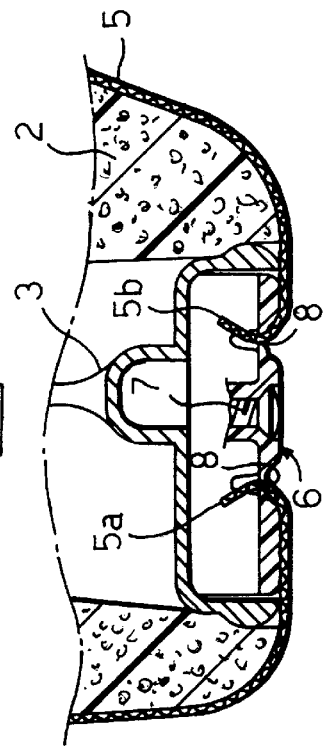

UPHOLSTERY SECURING DEVICE FOR A MOTOR-VEHICLE HEADREST AND THE LIKE

BACKGROUND OF THE INVENTION

The present invention is generally related to motor-vehicle equipment articles such as headrests and armrests, and even seats and inner liner panels, of the type comprising a body made of a relatively yelding material and a flexible upholstery sheet laid over the body.

More particularly, the invention is directed to an upholstery securing device of such articles, comprising a retainer member fixed to the body and cooperating with edges of said flexible upholstery sheet for anchoring thereof to said body in a stretched condition.

In the specific case of a headrests, the retainer member is traditionally formed by a keep plate applied to the load bearing framework of the headrest in correspondence of a seat formed at the base of the yelding material body. The edges of the flexible upholstery sheet are folded into this seat, and restrained therein by the peripheral edges of the keep plate, which is normally fixed mechanically to the load bearing framework of the headrest by means of screws or the like. A construction of this type is known, for instance, from EP-A-0322373 in the name of the same Applicant.

According to the above known solution, the upholstery securing step in connection with a headrest or similar equipment article for motor-vehicles is a relatively long and difficult operation. Moreover, the mere restraint of the flexible upholstery sheet performed by the edges of the keep plate may be subjected in use to loosening, with anti-aesthetical consequences which may derive thereby.

SUMMARY OF THE INVENTION

The object of the present invention is to overcome the above drawbacks, and to provide an upholstery securing device of the type set forth at the beginning which on one hand is able to afford extremely simple and quick anchoring of the edges of the flexible upholstery sheet, and on the other hand prevents any risks of release or anyhow loosening thereof.

According to the invention, this object is achieved essentially by virtue of the fact that said retainer member is provided with at least one indented slot for receiving and irreversibly anchoring at least one edge of the flexible upholstery sheet.

The invention contemplates alternative embodiments, in one of which a single indented slot receives a pair of opposite edges of the flexible upholstery sheet, and in another one of which the retainer member is provided with at least a pair of spaced-apart indented slots each receiving one respective edge of the flexible upholstery sheet.

The or each slot is conveniently delimited by a pair of mutually alternated and compenetrated juxtaposed rows of resiliently bendable tooth appendages.

Preferably the retainer member is constituted by a moulded plastic material plate and the tooth appendages are integrally formed with said plate and are arranged substantially parallely to the plane thereof.

BRIEF DESCRIPTION OF THE DRAWINGS

The invention will now be disclosed in detail with reference to the accompanying drawings, purely provided by way of non limiting example, in which:

FIG. 1 is a diagrammatic front elevational view showing the device according to the invention in combination with a headrest for motor-vehicle seats, FIG. 2 is a vertically sectioned and enlarged view along line II—II of FIG. 1, FIG. 3 is bottom plane view in an enlarged scale of FIG. 1, FIG. 4 shows a variant of FIG. 3, FIG. 5 is a view similar to FIG. 2, partial and in a reduced scale, referred to the variant of FIG. 4, and FIG. 6 shows in an enlarged scale a detail of FIG. 3 or, respectively, of FIG. 4.

DETAILED DESCRIPTION OF THE INVENTION

In the drawings, reference numeral 1 generally designates a headrest for motor-vehicle seats, essentially comprising a yelding body or cushion 2 made of foamed thermoplastic material embodying a load bearing framework 3 made of rigid moulded plastic material and connected to a pair of parallel support rods 4.

The yelding body 1 is lined by a flexible upholstery sheet 5 (made of cloth, leather or any suitable material), having edges 5a, 5b irreversibly anchored to the load bearing framework 3 of the headrest 1 by means of a retainer member generally designated as 6.

In the case of the shown example, the retainer member 6 is constituted by a moulded plastic material plate having a generally quadrangular design, fixed to the load bearing framework 3 for instance by screws 7, in correspondence of the base of the yelding body 2. It is however to be pointed out that both the general design, and the fixing mode of the retainer member 6 to the headrest 1 (and, more generally, to similar inner equipment articles for motor-vehicles such as seat armrests and the like) may be different from those depicted in the drawings. Accordingly, for instance, the retainer member 6 may also be conveniently formed integrally in one moulded piece with the load bearing framework 3.

According to the fundamental feature of the invention, the retainer member 6 is provided with at least one indented slot for receiving and irreversibly anchoring at least one edge of the flexible upholstery sheet 5. In the case of the embodiment shown with reference to FIGS. 2 and 3, the retainer member 6 has a single indented slot designated as 8, extending longitudinally to a maximum extent along the retainer member 6. As shown in detail in FIG. 6, the slot 8 is formed with a zigzag design and is delimited by two juxtaposed rows of appendages defined by mutually alternated and compenetrated resiliently flexible teeth 9, 10, arranged parallely to the general plane of the plate 6. Both opposite edges 5a, 5b of the flexible upholstery sheet 5 are engaged through the slot 8 (as better seen in FIG. 2), thus being thereby anchored under tension to the retainer member 6.

Resiliency of the teeth 9, 10, which is simply obtained upon moulding of the retainer member 6 by virtue of a reduced thickness of these teeth with respect to the general thickness of the plate, besides providing firm and steady restraint of the edges 5a, 5b, also affords anchoring thereof upon assembly of the headrest 1 following a simple and quick operation. To such effect it is simply necessary to lay firstly one and then the other edge 5a, 5b along the slot 8, and then causing them to pass through the slot 8 by means of a simple pushing tool, for instance designed as a blade, following resilient bending of the teeth 9 and 10. It will be apparent that in the anchored condition of the edges 5a, 5b within the slot 8 the retainer member 6 is completely lined by the flexible sheet 5.

In the case of the alternative embodiment shown in FIGS. 4 and 5, the retainer member 6 is instead formed with a pair of spaced-apart slots 8, the configuration of each of which is identical to that disclosed in the above with reference to FIG. 6. In this case each edge 5a, 5b of the flexible sheet 5 is separately engaged through a respective indented slot 8, and accordingly the central area of the retainer member 6 comprised between the two slots 8 is evidently not covered by the sheet 5. The anchoring operation of the edges 5a, 5b into the related slots 8 are identical to those already previously disclosed in the above.

As also already pointed out, the invention can be put into practices not only as far as a headrest is concerned, but even in connection with any inner equipment article for motor-vehicles comprising a body made of a relatively soft material and a flexible upholstery sheet laid over the body, such as for instance an armrest, a seat and an inner lining panel.

Naturally the details of construction and the embodiments may be widely varied with respect to what has been described and illustrated, without departing from the scope of the present invention, such as defined in the appended claims.

What is claimed is:

1. An upholstery securing device for a motor-vehicle article having a body made of a relatively yielding material and a flexible upholstery sheet laid over said body and having respective edges, said device comprising a retainer member adapted to cooperate with at least one of said edges of said flexible upholstery sheet for anchoring said sheet to said body in a stretched condition, said retaining member being provided with at least one indented slot for receiving said at least one edge of said flexible upholstery sheet, and a pair of juxtaposed rows of mutually alternated resiliently bendable tooth appendages delimiting said at least one indented slot and engageable with said at least one edge of said sheet, said retainer member having means for fixedly securing said retainer member to said body so as to prevent in use opening of said at least one indented slot after said at least one edge of said flexible upholstery sheet has been received therein, whereby anchoring of said at least one edge of said flexible upholstery sheet relative to said tooth appendages is made irreversible.

2. Device according to claim 1, wherein said indented slot receives a pair of opposite edges of said flexible upholstery sheet.

3. Device according to claim 1, wherein said retainer member is provided with at least a pair of spaced-apart indented slots.

4. Device according to claim 1, wherein said retainer member is constituted by a moulded plastic material plate and said tooth appendages are integrally formed with said plate and are arranged substantially parallel to the plane thereof.

5. Device according to claim 1, wherein said article embodies a moulded plastic material load bearing structure and said retainer member is integrally formed with said load bearing framework.

6. Device according to claims 1 in combination with a headrest for motor-vehicle seats.

* * * * *